(12) United States Patent
Gilstrap et al.

(10) Patent No.: US 7,131,030 B2
(45) Date of Patent: Oct. 31, 2006

(54) METHOD AND SYSTEM FOR STORING FIELD REPLACEABLE UNIT REPAIR HISTORY INFORMATION

(75) Inventors: Raymond J. Gilstrap, Milpitas, CA (US); Emrys Williams, Milton Keynes (GB)

(73) Assignee: Sun Microsystems, Inc., Santa Clara, CA (US)

( * ) Notice: Subject to any disclaimer, the term of this patent is extended or adjusted under 35 U.S.C. 154(b) by 561 days.

(21) Appl. No.: 10/413,325

(22) Filed: Apr. 14, 2003

(65) Prior Publication Data

US 2004/0153686 A1 Aug. 5, 2004

Related U.S. Application Data

(60) Provisional application No. 60/381,400, filed on May 17, 2002, provisional application No. 60/381,399, filed on May 17, 2002, provisional application No. 60/381,386, filed on May 17, 2002, provisional application No. 60/381,130, filed on May 17, 2002.

(51) Int. Cl.
*G06F 11/00* (2006.01)
*G06F 11/34* (2006.01)
*G06F 11/30* (2006.01)

(52) U.S. Cl. .................. 714/25; 714/47; 702/187
(58) Field of Classification Search ............ 714/26
See application file for complete search history.

(56) References Cited

U.S. PATENT DOCUMENTS

| | | | |
|---|---|---|---|
| 5,068,851 A | 11/1991 | Bruckert et al. | |
| 5,253,184 A * | 10/1993 | Kleinschnitz | 702/184 |
| 5,293,556 A | 3/1994 | Hill et al. | |
| 5,404,503 A | 4/1995 | Hill et al. | |
| 5,530,946 A | 6/1996 | Bouvier et al. | |
| 5,552,999 A | 9/1996 | Polgreen et al. | |
| 5,761,413 A | 6/1998 | Frank et al. | |
| 5,784,624 A | 7/1998 | Douglass et al. | |
| 5,794,065 A | 8/1998 | Hatakeyama et al. | |
| 5,822,692 A * | 10/1998 | Krishan et al. | 455/419 |
| 5,867,809 A | 2/1999 | Soga et al. | |
| 5,961,215 A | 10/1999 | Lee et al. | |
| 6,016,758 A * | 1/2000 | Tomita | 112/470.04 |
| 6,058,052 A | 5/2000 | Steadman | |
| 6,070,253 A | 5/2000 | Tavallaei et al. | |
| 6,154,728 A | 11/2000 | Sattar et al. | |
| 6,198,245 B1 | 3/2001 | Du et al. | |

(Continued)

FOREIGN PATENT DOCUMENTS

EP 623 900 11/1994

(Continued)

OTHER PUBLICATIONS

Perl for System Administration by David Blank-Edelman Published by O'Reilly, 2000 ISBN: 1565926099.*

(Continued)

*Primary Examiner*—Scott Baderman
*Assistant Examiner*—Joseph Schell
(74) *Attorney, Agent, or Firm*—Lawrence J. Merkel; Meyertons, Hood, Kivlin, Kowert & Goetzel, P.C.

(57) ABSTRACT

A method for tracking repair histories includes providing a field replaceable unit having a memory device, generating a repair history record associated with a repair request for the field replaceable unit, and storing the repair history record in the memory device. A computing system includes a field replaceable unit including a memory device configured to store a repair history record associated with repairs performed on the field replaceable unit.

13 Claims, 5 Drawing Sheets

U.S. PATENT DOCUMENTS

| | | | |
|---|---|---|---|
| 6,249,838 B1 | 6/2001 | Kon | |
| 6,289,735 B1 | 9/2001 | Dister et al. | |
| 6,308,289 B1 | 10/2001 | Ahrens et al. | |
| 6,349,268 B1 | 2/2002 | Ketonen et al. | |
| 6,415,395 B1 * | 7/2002 | Varma et al. | 714/37 |
| 6,425,055 B1 | 7/2002 | Sager et al. | |
| 6,519,552 B1 | 2/2003 | Sampath et al. | |
| 6,658,586 B1 | 12/2003 | Levi | |
| 6,684,180 B1 | 1/2004 | Edwards et al. | |
| 6,691,064 B1 * | 2/2004 | Vroman | 702/183 |
| 6,708,297 B1 | 3/2004 | Bassel | |
| 6,721,685 B1 * | 4/2004 | Kodama | 702/184 |
| 6,738,748 B1 | 5/2004 | Wetzer | |
| 6,742,145 B1 | 5/2004 | Bailey et al. | |
| 6,789,214 B1 | 9/2004 | De Bonis-Hamelin et al. | |
| 6,845,306 B1 * | 1/2005 | Henry et al. | 701/29 |
| 6,892,159 B1 | 5/2005 | Weiss et al. | |
| 6,920,519 B1 | 7/2005 | Beukema et al. | |
| 2002/0169871 A1 | 11/2002 | Cravo de Almeida, et al. | |
| 2003/0167273 A1 | 9/2003 | Alexander et al. | |

FOREIGN PATENT DOCUMENTS

| | | |
|---|---|---|
| WO | 03/014752 | 2/2003 |

OTHER PUBLICATIONS

Engineering Statistics Handbook http://www.itl.nist.gov/div898/handbook/apr/section2/apr234.htm Oct. 29, 2000 version found via the Way Back Machine.*

Engineering Documentation Control Handbook (2nd Edition) by F.B. Watts Published by William Andrew Publishing/Noyes 2000 ISBN 0-8155-1446-8.*

Nebraska Department of Education General Glossary http://www.nde.state.ne.us/READ/FRAMEWORK/glossary/general_p-t.html Jan. 29, 2002 version found via the Way Back Machine.*

William K. Hogan, et al., "SMT Connectors for Removable Small-Form-Factor Transceiver Modules," 2000 Electronic Components and Technology Conference, IEEE, pp. 1164-1172.

Lisa Spainhower, et al., Design for Fault-Tolerant in System ES/9000 Model 900, 1992 IEEE, pp. 38-47.

P.L. Hunter, et al., "Fault Tolerant, Hot-Pluggable Power System Design," 1994 IEEE, pp. 815-822.

"ON-Field Replaceable Unit Identification and Error Storage," IBM Technical Disclosure Bulletin, Sep. 1, 1994, vol. 37, Issue 9, 3 pages.

"Data Mining 101," aboutAI.net, Aug. 6, 2000, 3 pages.

JP2002250578, Abstract, "Refrigerating Container," Sep. 6, 2002, 5 pages.

Hewlett Packard, White Paper, "IPMI: Intelligent Platform Management Interface," Feb. 1998, 5 pages.

Intel, Hewlett-Packard, NEC, Dell, "-IPMI-Platform Event Trap Format Specification," v1.0, Revision 1.0, Dec. 7, 1998, 17 pages.

Intel, Hewlett-Packard, NEC, Dell, "-IPMI-IPMB v1.0 Address Allocation," Revision 1.0, Sep. 16, 1998, 5 pages.

Intel, Hewlett-Packard, NEC, Dell, "-IPMI-Platform Management FRU Information Storage Definition," v1.0, Revision 1.1, Sep. 27, 1999, 27 pages.

Atmel Corporation, "2-Wire Serial EEPROM," Rev. 03361-SEEPR-07/02, 19 pages.

Atmel Corporation, "Interfacing 24CXX Serial EEPROMs," Rev. 0507D-05/01, 3 pages.

Atmel Corporation, "Atmel's Serial EEPROMs, Solutions for all your design needs," Jan. 1999, 7 pages.

IDEAS International.Pty., Ltd., "Sun-ft-SPARC," Competitive Profiles, Jan. 27, 1999, 2 pages.

Sun Microsystems, Inc., "Netra ft 1800 Module EEPROM v.4 Data File Specifications," 1998, 56 pages.

Sun Microsystems, Inc., "Netra ft 1800 Module EEPROM v.4 Data File Specifications, Repair and Reference Fields," 1998, 32 pages.

Sun Microsystems, Inc., "Netra ft 1800 Module EEPROM v.4 Data File Specifications, RMM-Specific Data," 1998, 4 pages.

Sun Microsystems, Inc., "Netra ft 1800 Module EEPROM v.4 Data File Specifications, PCI Card-Specific Data," 1998, 4 pages.

Sun Microsystems, Inc., "Netra ft 1800 Module EEPROM v.4 Data File Specifications, Disk Chassis-Specific Data," 1998, 4 pages.

Sun Microsystems, Inc., "Netra ft 1800 Module EEPROM v.4 Data File Specifications, Motherboard-Specific Data," 1998, 6 pages.

Sun Microsystems, Inc., "Netra ft 1800 Module EEPROM v.4 Data File Specifications, CPUset-Specific Data," 1998, 9 pages.

Sun Microsystems, Inc., "Netra ft 1800 Module EEPROM v.4 Data File Specifications, Generic Data-All Modules," 1998, 20 pages.

"eeprom—display or alter information in a hardware module's eeprom," facsimile received on Jan. 31, 2003, printed on May 19, 1993. 2 pages.

* cited by examiner

| Timestamp 211 | Repair Vendor 212 | Repair Location 213 | Case Number 214 | Fault Detail 215 | Incoming Rev. Level 216 | Outgoing Rev. Level 217 | Symptom Code 218 | Cause Code 219 | Components Replaced 220 |
|---|---|---|---|---|---|---|---|---|---|

| Timestamp 231 | Total Return Count 232 | Total Repair Count 233 |
|---|---|---|

| Timestamp 251 | Firmware Revision 252 | Hardware Revision 253 | Hardware Rev. Level 254 |
|---|---|---|---|

METHOD AND SYSTEM FOR STORING FIELD REPLACEABLE UNIT REPAIR HISTORY INFORMATION

This patent application claims benefit of priority to U.S. Provisional Patent Application Ser. No. 60/381,386, filed on May 17, 2002. This patent application claims benefit of priority to U.S. Provisional Patent Application Ser. No. 60/381,399, filed on May 17, 2002. This patent application claims benefit of priority to U.S. Provisional Patent Application Ser. No. 60/381,400, filed on May 17, 2002. This patent application claims benefit of priority to U.S. Provisional Patent Application Ser. No. 60/381,130, filed on May 17, 2002. The above applications are incorporated herein by reference in their entireties.

BACKGROUND OF THE INVENTION

1. Field of the Invention

This invention relates generally to a processor-based computer system and, more particularly, to a method and system for storing field replaceable unit repair history information.

2. Description of the Related Art

The last several years have witnessed an increased demand for network computing, partly due to the emergence of the Internet. Some of the notable trends in the industry include a boom in the growth of Applications Service Providers (ASPs) that provide applications to businesses over networks and enterprises that use the Internet to distribute product data to customers, take orders, and enhance communications with employees.

Businesses typically rely on network computing to maintain a competitive advantage over other businesses. As such, developers, when designing processor-based systems for use in network-centric environments, may take several factors into consideration to meet the expectation of the customers, factors such as the functionality, reliability, scalability, and performance of such systems.

One example of a processor-based system used in a network-centric environment is a mid-frame server system. Typically, mid-frame servers are employed in high bandwidth systems requiring high availability factors. Minimizing system downtime is an important system management goal, as downtime generally equates to significant lost revenue. Typically, such computer systems are provided with replaceable components or modules that may be removed and/or installed without shutting down the system. This on-line replacement capability is commonly referred to as a hot-pluggable or hot-swappable environment.

Unlike current desktop computer systems, in which the internal cards and devices are essentially disposable (i.e., they are replaced if they fail, and the defective part is discarded without repair), the individual components used to construct higher end systems, such as the mid-frame server described above, are typically returned to the manufacturer or a third-party vendor associated with the manufacturer for repair. Repaired units are then reinstalled in the same or in a different mid-frame server. Such repairable components are commonly referred to as field replaceable units (FRUs). In the service life of a particular FRU, it may be installed in multiple servers owned by different customers. Exemplary units that may be field replaceable are system control boards, processing boards, memory modules installed on one of the processing boards, input/output (I/O) boards, power supplies, cooling fans, and the like.

Throughout the service life of a particular FRU, it may be serviced by different repair entities. After a certain number of repairs, the FRU may be scrapped. Because of the different entities involved in the repair process it is difficult to maintain accurate and retrievable repair histories for the individual FRUs. A repair depot that is no longer authorized by the manufacturer may be unwilling to open its repair records to the manufacturer or a different repair depot. Hence, it is sometimes difficult to identify FRUs with problematic service histories and/or to trend repair issues.

SUMMARY OF THE INVENTION

One aspect of the present invention is seen in a method for tracking repair histories. The method includes providing a field replaceable unit having a memory device, generating a repair history record associated with a repair request for the field replaceable unit, and storing the repair history record in the memory device.

Another aspect of the present invention is seen in a computing system including a field replaceable unit. The field replaceable unit includes a memory device configured to store a repair history record associated with repairs performed on the field replaceable unit.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, and/or magnetic signals capable of being stored, transferred, combined, compared, and otherwise manipulated. It has proven convenient at times, principally for reasons of common usage, to refer to these signals as bits, values, elements, symbols, characters, terms, numbers, and the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" and the like, refer to the action and processes of a computer system, or similar electronic computing device, that manipulates and transforms data represented as physical, electronic quantities within the computer system's registers and/or memories into other data similarly represented as physical quantities within the computer system memories and/or registers and/or other such information storage, transmission and/or display devices.

The programming instructions necessary to implement these software functions may be resident on various storage devices. Such storage devices referred to in this discussion may include one or more machine-readable storage media for storing data and/or instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, and/or modules in the various systems may be stored in respective storage devices. The instructions, when executed by a respective control unit, cause the corresponding system to perform programmed acts as described.

Figure 1:
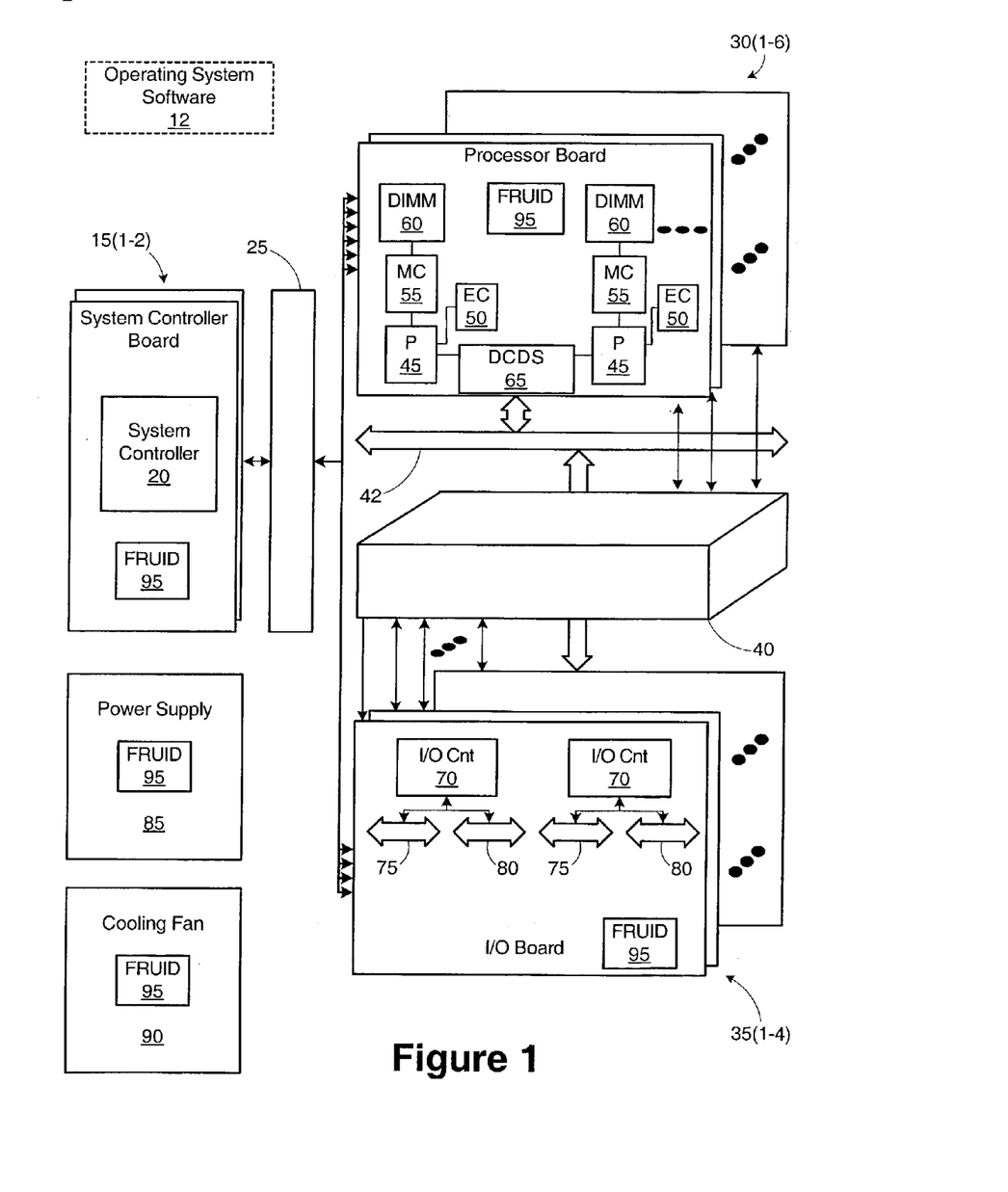
FIG. 1 is a simplified block diagram of a system in accordance with one embodiment of the present invention.

Referring now to FIG. 1, a block diagram of a system 10 in accordance with one embodiment of the present invention is illustrated. In the illustrated embodiment, the system 10 is adapted to run under an operating system 12, such as the Solaris™ operating system offered by Sun Microsystems, Inc. of Palo Alto, Calif.

The system 10, in one embodiment, includes a plurality of system control boards 15(1–2), each including a system controller 20, coupled to a console bus interconnect 25. The system controller 20 may include its own microprocessor and memory resources. The system 10 also includes a plurality of processing boards 30(1–6) and input/output (I/O) boards 35(1–4). The processing boards 30(1–6) and I/O boards 35(1–4) are coupled to a data interconnect 40 and a shared address bus 42. The processing boards 30(1–6) and I/O boards 35(1–4) also interface with the console bus interconnect 25 to allow the system controller 20 access to the processing boards 30(1–6) and I/O boards 35(1–4) without having to rely on the integrity of the primary data interconnect 40 and the shared address bus 42. This alternative connection allows the system controller 20 to operate even when there is a fault preventing main operations from continuing.

In the illustrated embodiment, the system 10 is capable of supporting 6 processing boards 30(1–6) and 4 I/O boards 35(1–4). However, the invention is not limited to such an individual implementation, as any number of such resources may be provided. Also, the invention is not limited to the particular architecture of the system 10.

For illustrative purposes, lines are utilized to show various system interconnections, although it should be appreciated that, in other embodiments, the boards 15(1–2), 30(1–6), 35(1–4) may be coupled in any of a variety of ways, including by edge connectors, cables, and/or other available interfaces.

In the illustrated embodiment, the system 10 includes two control boards 15(1–2), one for managing the overall operation of the system 10 and the other for providing redundancy and automatic failover in the event that the other board 15(1–2) fails. Although not so limited, in the illustrated embodiment, the first system control board 15(1) serves as a "main" system control board, while the second system control board 15(2) serves as an alternate hot-swap replaceable system control board.

The main system control board 15(1) is generally responsible for providing system controller resources for the system 10. If failures of the hardware and/or software occur on the main system control board 15(1) or failures on any hardware control path from the main system control board 15(1) to other system devices occur, system controller failover software automatically triggers a failover to the alternative control board 15(2). The alternative system control board 15(2) assumes the role of the main system control board 15(1) and takes over the main system controller responsibilities. To accomplish the transition from the main system control board 15(1) to the alternative system control board 15(2), it may be desirable to replicate the system controller data, configuration, and/or log files on both of the system control boards 15(1–2). During any given moment, generally one of the two system control boards 15(1–2) actively controls the overall operations of the system 10. Accordingly, the term "active system control board," as utilized hereinafter, may refer to either one of the system control boards 15(1–2), depending on the board that is managing the operations of the system 10 at that moment.

For ease of illustration, the data interconnect 40 is illustrated as a simple bus-like interconnect. However, in an actual implementation the data interconnect 40 is a point-to-point switched interconnect with two levels of repeaters or switches. The first level of repeaters is on the various boards 30(1–6) and 35(1–4), and the second level of repeaters is resident on a centerplane (not shown). The data interconnect 40 is capable of such complex functions as dividing the system into completely isolated partitions and dividing the system into logically isolated domains, allowing hot-plug and unplug of individual boards.

In the illustrated embodiment, each processing board 30(1–6) may include up to four processors 45. Each processor 45 has an associated e-cache 50, memory controller 55 and up to eight dual in-line memory modules (DIMMs) 60. Dual CPU data switches (DCDS) 65 are provided for interfacing the processors 45 with the data interconnect 40.

Each pair of processors 45 (i.e., two pairs on each processing board 30(1–6)) share a DCDS 65. Also, in the illustrated embodiment, each I/O board 35(1–4) has two I/O controllers 70, each with one associated 66-MHz peripheral component interface (PCI) bus 75 and one 33-MHz PCI bus 80. The I/O boards 35(1–4) may manage I/O cards, such as peripheral component interface cards and optical cards, that are installed in the system 10.

In the illustrated embodiment, the processors 45 may be UltraSPARCIII™ processors also offered by Sun Microsystems, Inc. The processors are symmetric shared-memory multiprocessors implementing the UltraSPARC III protocol. Of course, other processor brands and operating systems 12 may be employed.

Selected modules in the system 10 are designated as field replaceable units (FRUs) and are equipped with FRU identification (FRUID) memories 95. Exemplary FRUs so equipped may include the system controller boards 15(1–2), the processing boards 30(1–6), and the I/O boards 35(1–4). The system 10 may also include other units, such as a power supply 85 (interconnections with other devices not shown), a cooling fan 90, and the like, equipped with FRUIDs 95, depending on the particular embodiment.

Figure 2:
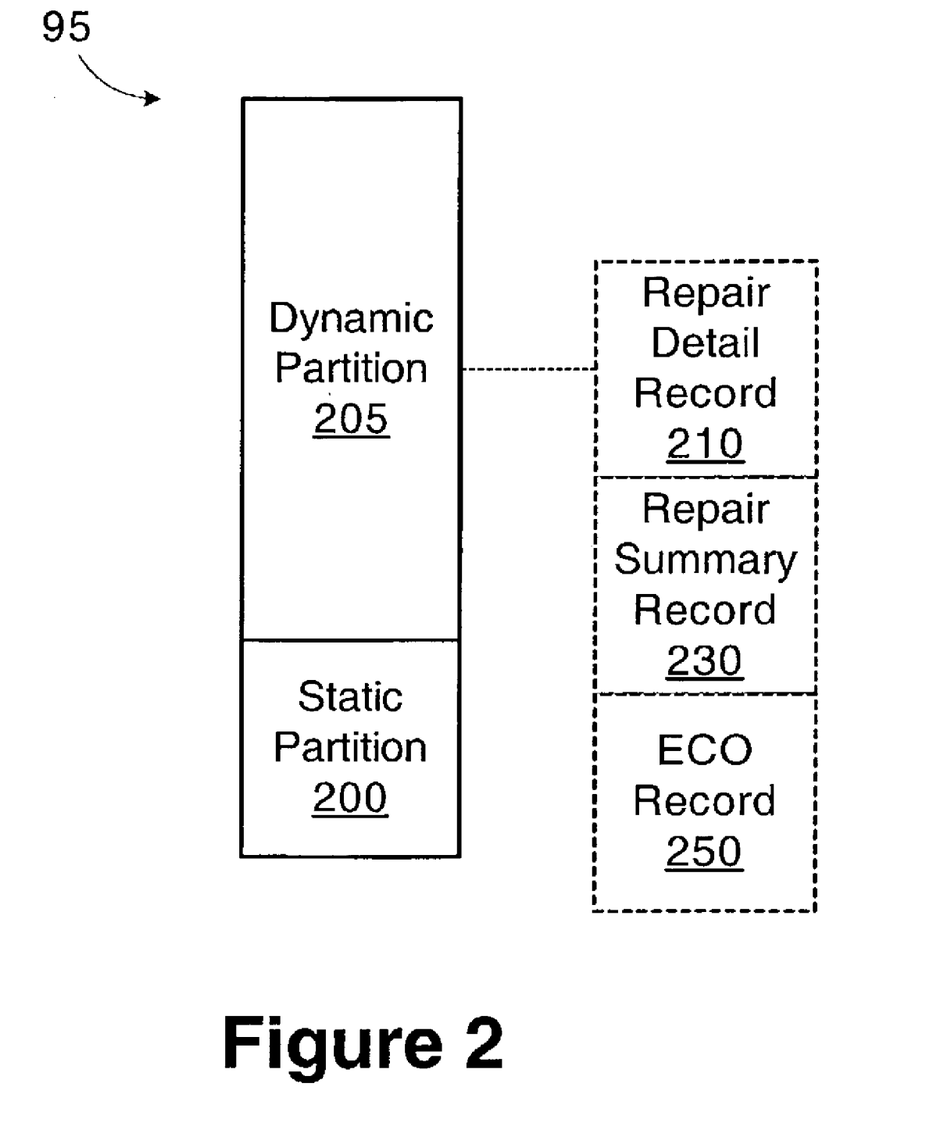
FIG. 2 is a diagram of a field replaceable unit identification (FRUID) memory.

Turning now to FIG. 2, a simplified diagram of the FRUID 95 is provided. In the illustrated embodiment, the FRUID 95 is a serial electrically erasable programmable read-only memory (SEEPROM) and has an 8 Kbyte space to store information about the associated FRU. Of course, other memory types and storage sizes may be used depending on the particular implementation. The FRUID 95 includes a 2 Kbyte static partition 200 dedicated to store "static" information and a 6 Kbyte dynamic partition 205 to store "dynamic" information.

The static information includes:
Manufacturing Data, such as part number, serial number, date of manufacture, and vendor name;
System ID Data, such as Ethernet address and system serial number; and
System Parameters (e.g., maximum speed, DIMM speed, and maximum power, and the like).
The dynamic information includes:
Operational History Data, such as hours of operation, number of power-ons, temperature log;
System configuration data, such as slot number and FRU hierarchy;
Physical Location Data, such as location of data center, latitude, longitude, and altitude;
Field Repair Data; and
Symptom and Diagnosis Data captured on a fault occurrence.

The particular format for storing data in the FRUID 95 is described in greater detail in U.S. Provisional Patent Application Ser. No. 60/381,400, incorporated above.

Some of the benefits derived from the information stored in the FRUID 95 are:
Fatal Error Identification—a fatal error bit may be set on FRU failure and will remain set until after the FRU has been repaired and reset by the repair depot to prevent "accidental" reuse of the failed FRU;
Ease of Tracking Errors—in the event the FRU has been "repaired" and returned to the field, and failed again subsequently with the same or similar failure, the failure log is tagged to insure special attention will be given to the failed FRU;
Trend Analysis–quick identification of certain batch of FRUs with known defects can be done by a serial number embedded into the SEEPROM;
Trend Analysis—quick analysis can be performed by collecting information of specific FRUs, including power-on hours, temperature logs, and the like;
Trend Analysis—quick identification of components from specific vendors on premature failures of certain FRUs; and
Field Change Orders can be applied easily with patches after identifying the range of affected FRU by serial numbers.

Figure 3:
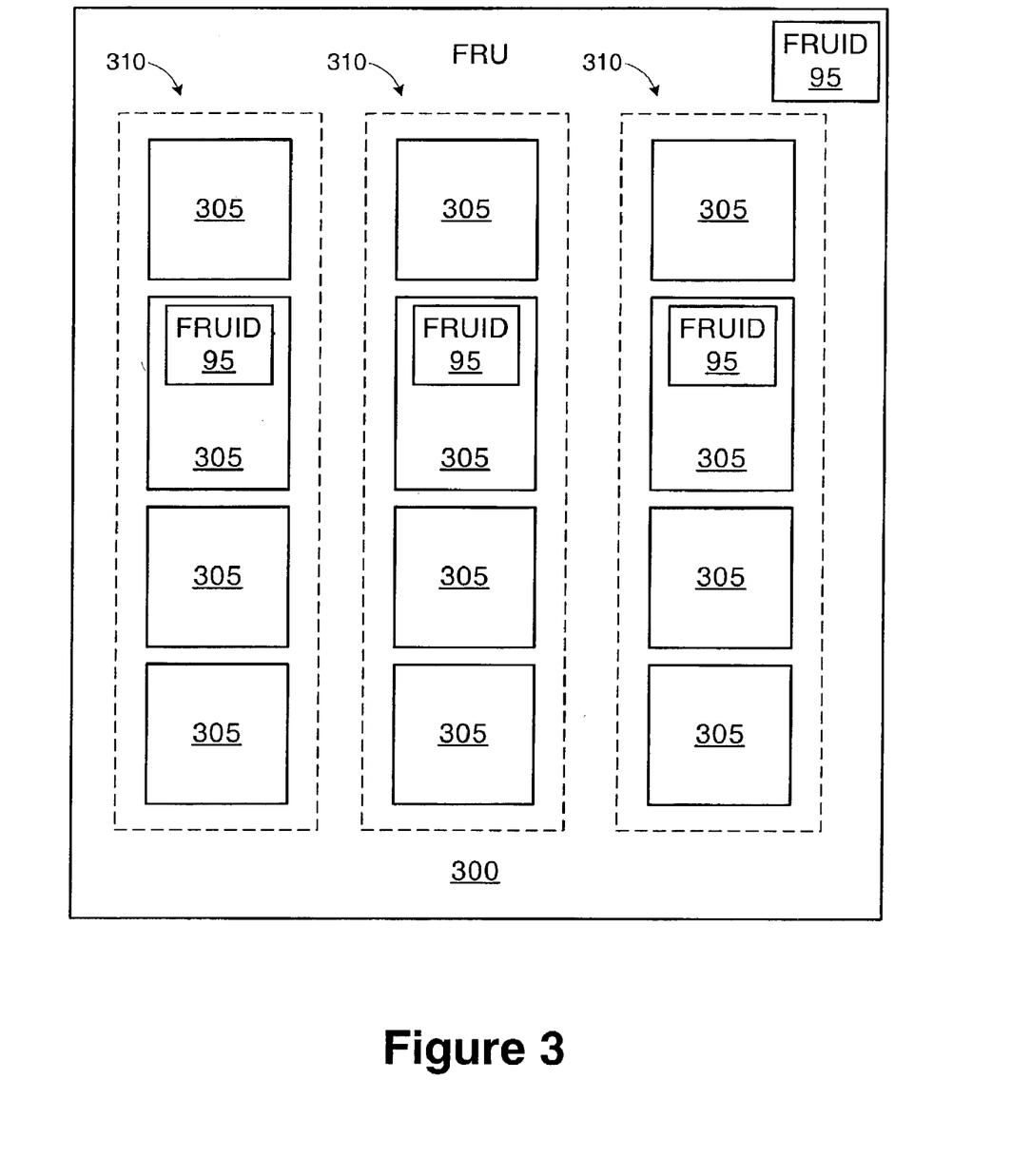
FIG. 3 is a simplified block diagram illustrating a field replaceable unit (FRU) having a plurality of submodules.

Referring now to FIG. 3, a simplified block diagram of an exemplary FRU 300 having a FRUID 95 is shown. As described above, the FRU 300 may represent one of the system control boards 15(1–2), one of the processing boards 30(1–6), one of the input/output (I/O) boards 35(1–4), the power supply 85, the cooling fan 90, and the like. The FRU 300 includes a plurality of submodules 305. For example, the FRU 300 may be a processing board 30(1–6), and the submodules 305 may be the processors 45, e-caches 50, memory controllers 55, and DIMMs 60. Selected submodules 305 (e.g., the DIMMS 60) may also be themselves field replaceable and have their own FRUIDs 95. The submodules 305 may be organized into groups 310. For example, a processor 45 and its associated e-cache 50, memory controller 55, and DIMMS 60 may be organized into a single group 310.

Returning to FIG. 2, the FRUID 95 is configured to store the repair history of its associated FRU 300 using a plurality of records. The repair records include a plurality of repair detail records 210, a repair summary record 230, and an engineering change order (ECO) record 250. In the illustrated embodiment, the repair records 210, 230, 250 are stored in the dynamic partition 205 of the FRUID 95.

Typically, the repair records are not updated while the FRU 300 is installed in the field at a customer location. Rather, the repair records are updated at a repair depot when a repair is completed on the FRU 300. FRUs 300 that are diagnosed as being defective in the field are removed from the system 10 and shipped to a repair depot where the necessary repairs are completed. In some cases, a repair depot may perform troubleshooting tests on the FRU 300 and fail to identify a problem. The repair information stored on the FRUID 95 may also include the number of times a returned FRU 300 is not diagnosed with a problem. Also, during a repair operation, one or more engineering change orders (ECOs) may be performed on the FRU 300 to upgrade its capability (e.g., upgrade a processor 45) or to fix problems or potential problems identified with the particular FRU 300 model. For example, a firmware change may be implemented or a semiconductor chip (e.g., application specific integrated circuit (ASIC)) may be replaced.

Each time a FRU 300 is returned for repair, a repair detail record 210 is created that describes the actions related to the repair activity. The repair detail records 210 detail the repair history for the FRU 300. In the illustrated embodiment, the last five repair detail records 210 are stored on the FRUID 95, although the invention is not limited to any particular number of records. Typically, a FRU 300 that requires repair more than three times may be scrapped. Accordingly, the number of repair detail records 210 that may be stored in the FRUID 95 may vary depending on factors such as the allowable number of repairs for a particular FRU 300.

Figure 4A:
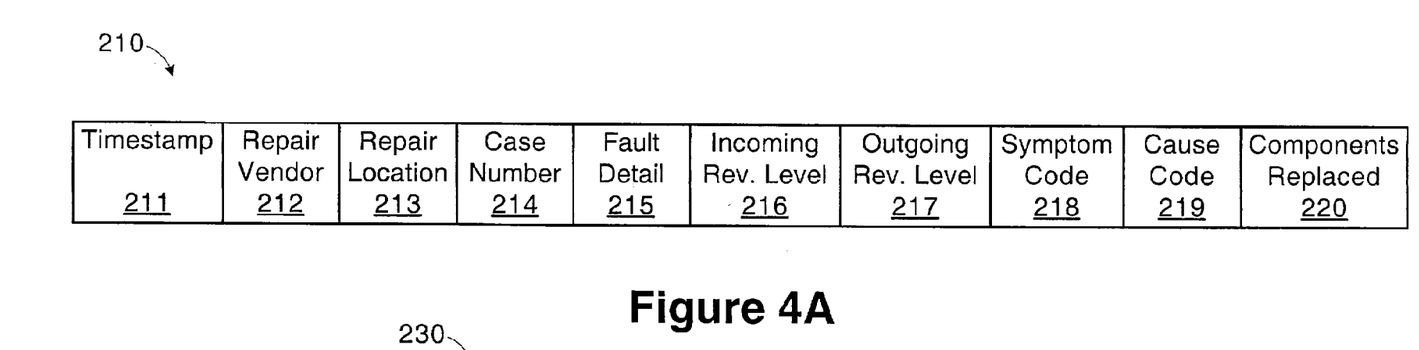
FIGS. 4A, 4B, and 4C are diagrams of exemplary repair records stored in the FRUID of FIG. 2.

Referring to FIG. 4A, an exemplary repair detail record 210 includes the following fields:
a timestamp field 211 that records the date of the last update to the repair detail record 210;
a repair vendor field 212 for recording the name of the company that performed the subject repair;

a repair location field 213 for recording the location (e.g., depot, city, state, country) where the repair was performed;

a case number field 214 for relating the physical FRU 300 to the repair activity;

a fault detail field 215 for recording a description of the fault and/or the symptoms;

an incoming revision level field 216 for recording the revision level of the FRU 300 prior to the repair;

an outgoing revision level field 217 for recording the revision level of the FRU 300 after the repair (i.e., an ECO may have been performed);

a symptom code field 218 for recording failure symptoms for trending analysis and enhanced fault characterization;

a cause code field 219 for recording the underlying cause(s) of the detected symptom; and a components replaced field 220 for specifying the components replaced during the repair.

Figures 4B, 4C:
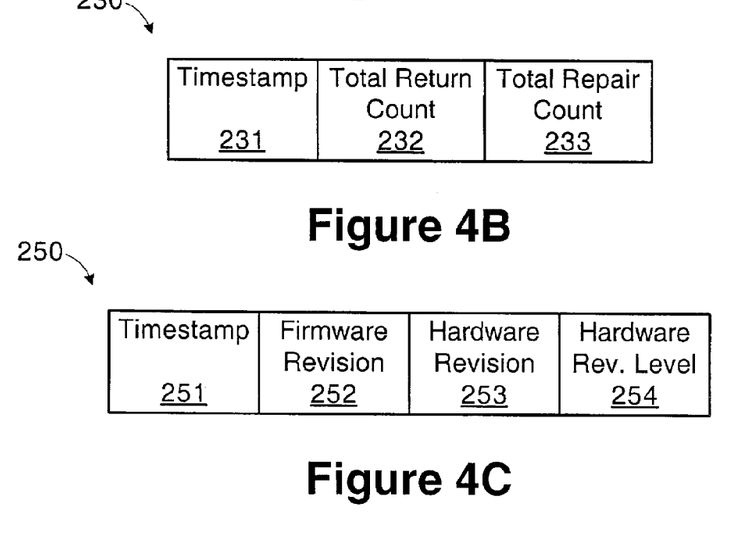

The repair summary record 230 includes counts of the number of times that the FRU 300 has been returned and the number of times that it has been repaired (i.e., physical rework). If no trouble is found, the return count is incremented, but not the repair count. Referring to FIG. 4B, an exemplary repair summary record 230 includes the following fields:

a timestamp field 231 that records the date of the last update to the repair summary record 230;

a total return count 232 indicating the total number of times the FRU 300 has been returned for repair (i.e., incremented even if no trouble is found at the repair depot); and a total repair count 233 indicating the total number of depot repairs performed (i.e., not incremented if no trouble is found).

The ECO record 250 tracks the current ECO level of the FRU 300. Referring to FIG. 4B, an exemplary repair summary record 230 includes the following fields:

a timestamp field 251 that records the date of the last update to the ECO record 250;

a firmware revision field 252 for specifying the ECO changes that affect the firmware revision of the FRU 300;

a hardware revision field 253 for specifying the ECO changes that affect the hardware revision level of the FRU 300; and a hardware revision level field 254 for recording the hardware revision level changes from ECOs performed after the initial build of the FRU 300.

The repair depot may have their own system 10, or some other specialized interface (not shown) for testing repaired FRUs 300 and updating the FRUID 95. In one embodiment, the system controller 20 may be instructed to write the repair history records 210, 230, 250 to the FRUID 95 by the operating system software 12 or by some other software application (not shown).

Figure 5:
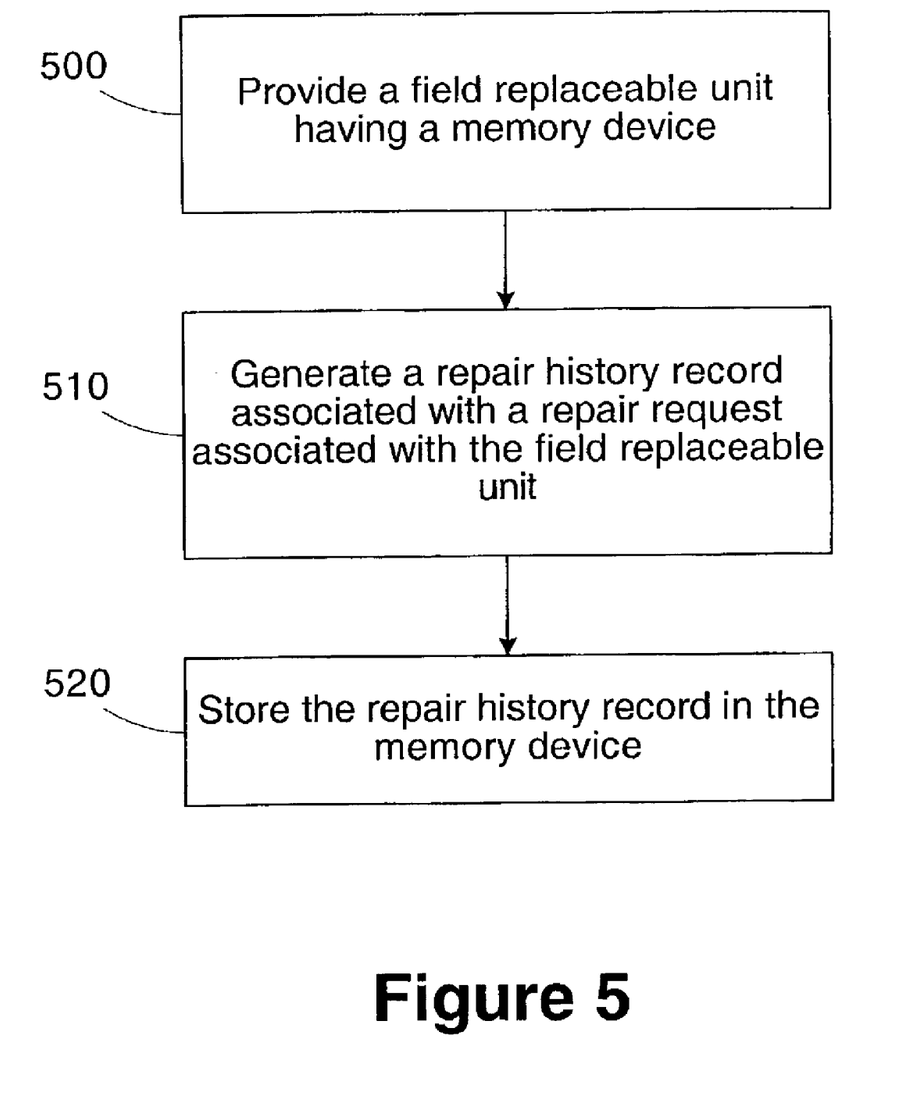
FIG. 5 is a simplified flow diagram of a method for tracking a repair history of a field replaceable unit in accordance with another embodiment of the present invention.

Turning now to FIG. 5, a simplified flow diagram of a method for storing repair history information in accordance with another embodiment of the present invention is provided. In block 500, a field replaceable unit having a memory device is provided. In block 510, a repair history record associated with a repair request for the field replaceable unit is generated. In block 520, the repair history record is stored on the memory device.

The repair records 210, 230, 250 specify the entire repair history of the FRU 300. Because the repair records 210, 230, 250 are stored on the FRUID 95, this repair history remains with the FRU 300. If different repair depots work on a particular FRU 300, each has access to the entire repair history. There is no need to request database records from different companies to construct the repair history.

Storage of the repair history on the FRUID 95 also provides advantages related to fault classification and trending. A method for collecting data stored in the FRUID 95 for subsequent trending is described in U.S. Provisional Patent Application Ser. No. 60/381,399, incorporated above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for tracking repair histories, comprising:

generating a repair history record associated with a repair request for a field replaceable unit, wherein the repair history record comprises a repair summary record, and wherein generating the repair history record further comprises incrementing a total return count in the repair summary record responsive to the repair request; and storing the repair history record in a memory device in the field replaceable unit.

2. The method of claim 1, wherein generating the repair history record further comprises generating a repair detail record corresponding to a given repair.

3. The method of claim 1, wherein generating the repair history record further comprises incrementing a total repair count in the repair summary record responsive to performing a physical repair on the field replaceable unit.

4. The method of claim 1, wherein generating the repair history record further comprises generating an engineering change order record that identifies a most recent engineering change order applied to the field replaceable unit.

5. The method of claim 4, wherein generating the engineering change order record includes generating the engineering change order record based on performing an engineering change order upgrade to the field replaceable unit.

6. The method of claim 2, further comprising:

storing a plurality of repair detail records; and deleting an oldest one of the repair detail records responsive to the number of repair detail records exceeding a predetermined threshold.

7. The method of claim 6, wherein deleting the oldest one of the repair detail records further comprises deleting the oldest one of the repair detail records responsive to the number of repair detail records exceeding five.

8. A computing system comprising a field replaceable unit including a memory device configured to store a repair history record associated with repairs performed on the field replaceable unit, wherein the repair history record comprises a repair summary record that includes a total return count that is incremented in response to a repair request for the field replaceable unit.

9. The system of claim 8, wherein the repair history record comprises a repair detail record.

10. The system of claim 9, wherein the memory device is configured to store a plurality of repair detail records.

11. The system of claim 10, wherein the memory device is configured to store at most five repair detail records.

12. The system of claim 8, wherein the repair summary record further comprises a total repair count.

13. The system of claim 8, wherein the repair history record further comprises an engineering change order record that identifies a most recent engineering change order applied to the field replaceable unit.

* * * * *